United States Patent [19]
Hidano

[11] Patent Number: 6,102,572
[45] Date of Patent: Aug. 15, 2000

[54] LINEAR MOTION GUIDE UNITS

[75] Inventor: Kengo Hidano, Kanagawa, Japan

[73] Assignee: Nippoon Thompson Co., Ltd., Tokyo, Japan

[21] Appl. No.: 09/262,037

[22] Filed: Mar. 4, 1999

[30] Foreign Application Priority Data

Mar. 4, 1998 [JP] Japan .................................. 10-067634

[51] Int. Cl.[7] .................................................. F16C 29/06
[52] U.S. Cl. .................... 384/45; 384/43; 384/51
[58] Field of Search ................. 384/43, 44, 45, 384/51

[56] References Cited

U.S. PATENT DOCUMENTS

| 5,927,858 | 7/1999 | Agari ........................................... 384/45 |
| 5,993,064 | 11/1999 | Teramachi et al. ......................... 384/43 |
| 6,024,490 | 2/2000 | Shirai ..................................... 384/45 X |

FOREIGN PATENT DOCUMENTS

| 40-024405 | 10/1965 | Japan . |
| 62-242126 | 10/1987 | Japan . |
| 05-052217 | 3/1993 | Japan . |
| 63-178659 | 11/1998 | Japan . |

*Primary Examiner*—Khoi Q. Ta
*Attorney, Agent, or Firm*—Browdy and Neimark, PLLC

[57] ABSTRACT

A linear motion guide unit is disclosed wherein separators are arranged between any adjoining rolling elements, or balls, running along endless-circulating passages and interconnected with each other through strings in such an individually replaceable manner. The separators are each interposed between any adjoining balls so as to space apart them from each other. The separators each have a separator column formed with ball-contacting surfaces for carrying the balls thereon at opposite faces in a running direction of the balls, and webs formed integrally with the column and extended fore-and-aft along the running direction of the balls over the balls, and the webs being each provided therein with channels. The separators are arranged between the adjacent balls in series and interconnected with each other by the strings that thread through the channels in the webs.

13 Claims, 5 Drawing Sheets

LINEAR MOTION GUIDE UNITS

BACKGROUND OF THE INVENTION

1. Field of the Invention

The present invention relates to a linear motion guide unit in which separating elements are each arranged between any adjoining rolling elements running along a circulating endless passages.

2. Description of the Prior Art

Conventionally a linear motion guide unit shown in FIG. 10 is well known to those skilled in the art.

The prior linear motion guide unit comprises an elongated track rail 2 having raceway grooves 4 on lengthwise side surfaces thereof, and a sliding element, or a slider 1, saddling on a track rail 2 so as to freely move along and with respect to the track rail 2 and having raceway grooves 9 confronting the raceway grooves 4 of the track rail 1. The slider 1 moves along the track rail 1 by virtue of rolling elements, or balls 7, running through raceways 16 defined between the confronting raceway grooves 4, 9. The track rail 2 has openings 13 boring through from an upper surface to a bottom surface thereof at locations spaced lengthwise from each other. The track rail 2 may be fixed together with the mounting base 20, such as a bed, machine base, work table or the like, by screwing bolts through the openings 13 of the track rail 2 and openings in the mounting base 15.

The slider 1 has a casing 5 movable relatively to the track rail 2, and end caps 6 secured to the opposing ends of the casing 5. Provided on the upper surface of the casing 5 are openings 19 for mounting the slider 1 to other appliances, parts, chucks, grasping jaws or the like. The end caps 6 are attached on the lengthwise opposing end surfaces of the casing 5 by means of bolts 25. Both of casing 5 and the end caps 6 are formed on the lower surfaces thereof with recesses 10 by which the casing 5 and end caps 6 may saddle on track rail 2 for free movement. The casing is provided with return passages 12 extending in parallel with the raceway grooves 9. The end caps 6 are provided with claws for scooping the balls 7 out of the raceways 16 defined between the confronting raceway grooves 4, 9 and turn-around passages, shown at 15 in FIG. 2, for endless circulation of the balls 7.

In the linear motion guide unit described above, retainer bands 18 are provided in the casing 5 so as to hold the balls 7 to thereby prevent the balls 7 from falling out of the casing 5. Bottom seals 8 are secured to the lower surfaces of the casing 5 and the end caps 6 to thereby for close clearances between the track rail 2 and the slider 1. Mounted on the end caps 6 are end seals 17 for keeping sealing function between the track rail 2 and the lengthwise opposing ends of slider 1.

The balls 7 run along the load areas, that is, the raceway 18 defined between the raceway grooves 4 of the track rail 2 and the raceway grooves 9 of the casing 5, and then come in the turnaround passages 15 in any one of the end caps 6. The balls 7 further run from the turnaround passages 15 to the return passages 12 that are formed in the casing 5 in parallel with the raceway grooves 9. Subsequently the balls 7 return to the loaded areas of the raceways 16 through the turnaround passages 15 in the other one of the end caps 6. It will be thus understood that the balls 7 may run in a circulating manner though the raceways 16, turnaround passages, shown at 21 in FIG. 2, and return passages 12, causing the smooth movement of the slider 1 relatively to the track rail 2. Lubricant may be supplied through grease nipples 11 into the casing 5 so as to lubricate the raceway grooves 4, 9 along which run the balls 7.

Disclosed in Japanese Utility Model Laid-Open No. 178659/1988 is a machine element for smoothly transmitting torque by virtue of circulation of the balls. The machine element includes therein members that are arranged between the adjoining balls so as to convert the contact relation of the adjoining balls from direct rolling-contact relation to line-contact or area-contact relation to thereby reduce the contact stress so that clearances between the adjoining balls may be ensured for the provision of the lubricant films or for retaining the lubricant therein. The members interposed between any two adjoining rolling elements are usually formed in a cylinder and are apt to be worn away. In such machine element as described above, there are adverse possibilities in which the worn members may stumble along the raceways, resulting in being caught between the raceway grooves and the balls and in which the worn members may fall off from the slider.

Separators for ball bearings are disclosed in Japanese Patent Publication No. 24405/1965, wherein the separators are interposed between any adjoining balls, the separators being each comprised of a cylinder and a web that is designed so as to make contact with the adjacent webs of the separators whereby the webs may directly transmit to each other the force acting on the separators in the rotating direction of the ball bearing. On such separators of the ball bearings, the webs are formed so as to make contact with each other and, therefore, the curvature of the bearing is inevitably fixed in radius.

Moreover another linear motion rolling bearing disclosed in Japanese Patent Laid-Open No. 242126/1987, wherein there are provided retainer bands for keeping in position rolling elements, the retainers being each provided with openings to hold the rolling elements therein with a small clearance apart, and further formed with annular thin ridges around the openings to keep the balls against falling off the bearing. Nevertheless, the retainer band, when being damaged at a location, at least, should be entirely replaced with new one.

Further, a chain of balls disclosed in Japanese Patent Laid-Open No. 52217/1993 comprises ball retainers each interposed between any adjoining two balls that are arranged in series, and a flexible elongated member for connecting together the balls and retainers in a tandem array. The ball chain may be bent in an endless form. The ball chain has been produced by the steps of forming the retainers and connecting members integrally by the injection molding, and then inserting the balls in the mold to thereby finish the integrated product with the balls. This integrated molding of the retainers with the connecting members by injection molding disadvantageously renders the molding machines and molds large-scaled and production works much more difficult. In addition, the ball chain, when being damaged at a location, at least, should be entirely replaced with new one.

Meantime the linear motion guide unit shown in FIG. 10 is a ball-rolling type in which balls 7 run in an endless circulation with making contact with each other. Such ball-rolling type guide units are of various types and also presently availed in extended fields.

The linear motion guide units are recently required more and more to deal with the low noise, maintenance-free design and high-speed operation. Nevertheless, presently available ball-rolling type guide units scarcely render the requirements satisfactory because the balls make metal-contact to thereby cause the reaction at the direct contact, resulting in generating noise.

SUMMARY OF THE INVENTION

The present invention, therefore, has as its primary object to overcome the shortcomings in the prior art and in particular, to a linear motion guide unit comprised of separators formed separately and arranged between any adjoining rolling elements, or balls, to keep the balls against the direct contact with each other, resulting in reducing noise and preventing wear owing to the direct contact between the adjacent balls.

In one aspect of the present invention, a linear motion guide unit is provided in which a string interconnects separators so as to keep the separators from falling off from endless-circulating passages, stumbling along the passages and also catching in raceways.

In another aspect of the present invention, a linear motion guide unit is provided in which the interconnected separators are allowable to move freely to some extent so that the separators are free from local load or force with result of improvement in durability. According to the design described just above, even if any separator is damaged, the damaged separator alone may be replaced individually with no influence on residual normal separators.

The present invention is more particularly concerned with a linear motion guide unit comprising; a track rail having first raceway grooves on lengthwise side surfaces thereof; a slider movable in a sliding manner along and with respect to the track rail and composed of a casing and end caps attached on the casing, and the casing having second raceway grooves confronting the raceway grooves of the track rail; balls running through endless-circulating passages that consists of return passages in the casing, turnaround passages in the end caps and raceways defined between the confronting raceway grooves; separators arranged between any two adjoining balls running through the endless-circulating passages so as to space apart the balls from each other; the separators each having a separator column formed with ball-contacting surfaces for carrying the balls thereon at opposite faces in a running direction of the balls, and webs formed integrally with the column and extended fore-and-aft along the running direction of the balls over the balls, and the webs being each provided therein with channels; and strings threading through the channels in the web so as to interconnecting the separators in series.

In another aspect of the present invention, the webs each have a length along the running direction of the balls, the length being shorter than a span between centers of the adjoining balls that are arranged on opposite faces of the separator interposed therebetween. While webs each have a widthwise length, normal to the running direction, which is less than a clearance between any one of the lengthwise side surfaces of the track rail and a confronting inner surface of any one of depending side sections of the slider. This permits the separators to smoothly run through the raceways in the endless-circulating passages without the obstructive interference with the confronting inner walls of the track rail and casing.

In another aspect of the present invention, the columns of the separators each have a widthwise length, normal to the running direction, which is shorter than a diameter of the ball so as to not extend over the spherical surface of the ball, so that the column has no interference with the walls of the endless-circulating passages during the travel of the separators along the endless-circulating passages.

In a further aspect of the present invention, the centers of the ball-contacting surfaces on the columns are offset towards inner curvature wall in the endless-circulating passages with respect to the centers of the separators. This may ensure the separators the smooth travel that conforms to the curvatures of the passages with no collision against the walls of the turnaround passages at the time during the separators run through the turnaround passages.

In another aspect of the present invention, the channels in the webs are each provided at a slit thereof with opposing lips to keep the string from unexpected falling off from its associated channel. This makes it possible to attach the separators to the strings in a detachable manner. Nevertheless, the separators are certainly kept from unexpected falling off from the strings channels 29 under operation of the machines having incorporated with the linear motion guide units. Further the damaged separator alone may be replaced with new one by simply detaching and attaching to the strings.

In another aspect of the present invention, the separators are designed so as to be movable in a sliding manner with respect to the strings threading through the channels in the webs and also detachably attached to the strings. By this design, the separators are free from the unequal tensile force by the strings and any damaged or worn separators may be replaced individually by detaching them from the strings.

In an additional aspect of the present invention, the string is cut off at one location in the endless-circulating passage 21. As an alternative, the strings may be formed in endless continuity. Moreover the strings are made of any of synthetic resin filaments, metal wires, synthetic resin-coated metal wires and strands. Hence the strings may be selected in either endless type or sheared type, and in their material so as to ensure the most preferable mechanical strength and string size in accordance with the type of the linear motion guide unit to be used.

In another aspect of the present invention, the separators are made of any one of synthetic resin and lubricant-impregnated synthetic resin. In addition, the separators are each provided at the ball-contacting surfaces thereof with openings for receiving lubricant therein. According to this aspect, the separators may constantly lubricate the running surfaces of the balls to thereby accomplish the reduction in friction on the balls, separators and the walls of the endless-circulating passages so that the balls and separators may run smoothly.

In a further another aspect of the present invention, recesses for guide the webs are formed at both of the return passages in the casing and the turnaround passages in the end caps. By this design, the balls are permitted to transfer from the raceways to the turnaround passages, from the turnaround passages to the return passages and further from the return passages to the raceways with no rattling resistance.

In another aspect of the present invention, the channels in the webs of the separators are partly cut away at their lengthwise opposing ends. By this design, the strings threading through the channels may easily deform in conformity with the curvature of the turnaround passages so as to eliminate such obstructive interference that might otherwise occur at the separators, resulting in helping ensure the smooth travelling along the turnaround passages.

According to the linear motion guide unit of the present invention, the synthetic resin-made separators are interposed between the adjoining balls so as to space apart the balls from each other and, therefore, no direct metal-to-metal contact happens that might otherwise causes noise and ball wear. On the other hand, strings interconnect separators with each other so as to keep the separators from falling off from endless-circulating passages, stumbling along the passages and also catching in raceways. This helps the separators between the adjoining balls travel smoothly together with the balls.

The linear motion guide unit of the present invention constructed described just above may provides an advantage in which the synthetic resin-made separators are individually arranged between the adjoining balls running through the endless-circulating passages so as to keep the balls from the direct metal-to-metal contact to thereby diminish noise and also protect the balls from wear owing to the metal-to-metal collision of balls. The linear motion guide unit of this invention has another advantage in which the strings interconnect separators with each other so as to keep the separators from falling off from endless-circulating passages, stumbling along the passages and also catching in raceways, and further the strings permit the separators to make movement to some extent to thereby prevent the tensile force acting to only the specific separators, resulting in improving the durability. A further advantage of this invention resides in that as the separators are detachably arranged on the strings, even if the any separators are damaged, the damaged separators alone may be replaced with new one and the guide unit may be immediately restarted by simply detaching and attaching to the strings.

Other objects and features of the present invention will be more apparent to those skilled in the art on consideration of the accompanying drawings and following specification wherein are disclosed preferred embodiments of the invention with the understanding that such variations, modifications and elimination of parts may be made therein as fall within the scope of the appended claims without departing from the spirit of the invention.

DETAILED DESCRIPTION OF THE PREFERRED EMBODIMENTS

Figure 1:
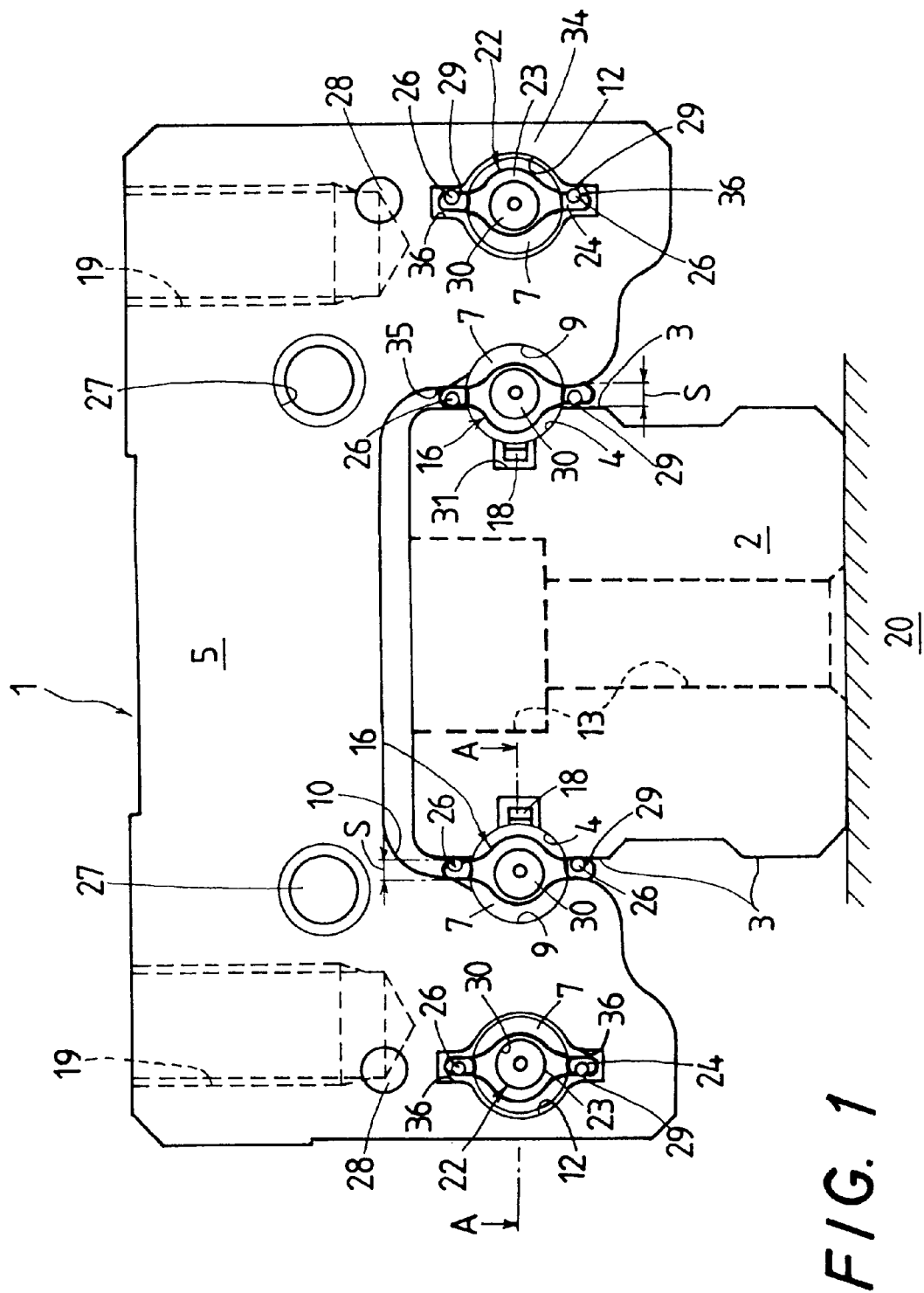
FIG. 1 is a front elevation showing a preferred embodiment of a linear motion guide unit according to the present invention, but in which the end cap is removed from the casing.

Referring now in detail to the drawings, the linear motion guide unit provided with the rolling elements according to the present invention will be explained below. First referring to FIGS. 1 to 5, a linear motion guide unit embodying the present invention will be explained hereinafter. In the following description, similar reference characters designate elements or components identical or similar in structure and function in both the linear motion guide unit in FIGS. 1 and 2 and the prior guide unit described above with referring to FIG. 10, and the previous description will be applicable.

Figure 2:
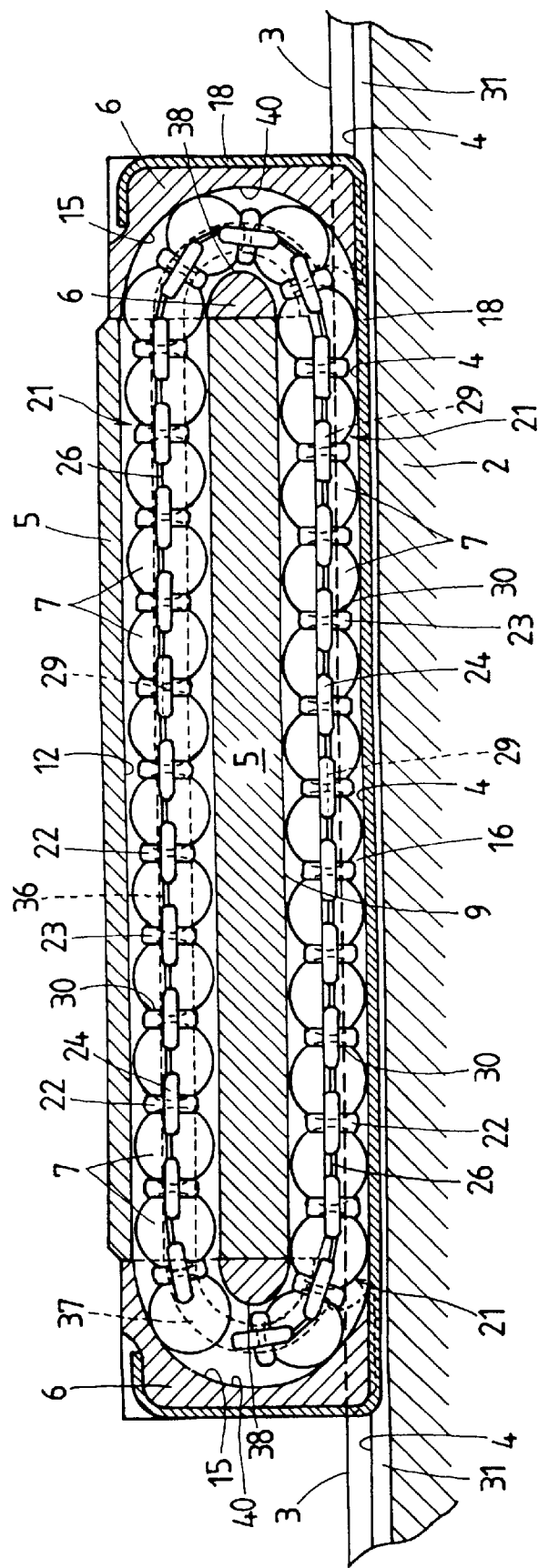
FIG. 2 is a sectional view showing any one of the endless-circulating passages in the linear motion guide unit of FIG. 1 and is taken along the A—A of FIG. 1.
Figure 10:
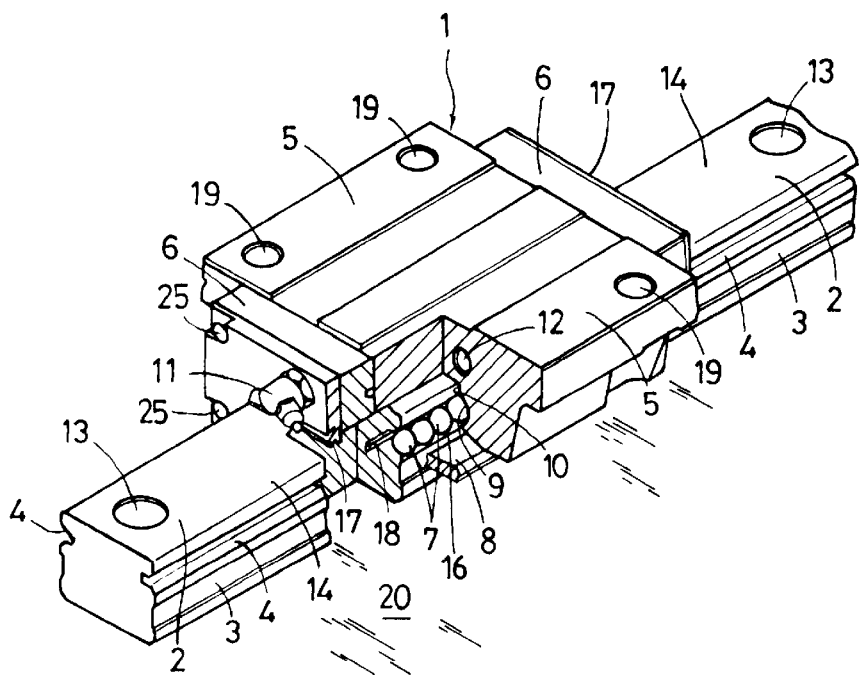
FIG. 10 is a partially cutaway perspective view showing a prior linear motion guide unit.

The linear motion guide unit shown of the present invention shown in FIGS. 1 and 2 is comprised of the track rail 2 having the first raceway grooves 4 on the lengthwise side surfaces thereof, the sliding element, or a slider 1, movable along and with respect to the track rail 2 and having the second raceway grooves 9 confronting the raceway grooves 4 of the track rail 1, the slider 1 being composed of the casing 5 having the return passages 12 therein and the end caps 6 secured on the lengthwise opposing ends of the casing 5 and provided therein with the turnaround passages 15, the rolling elements, or the balls 7, running through the endless-circulating passages 21 consisting of the return passages 12, turnaround passages 15 and raceways 16 defined between the confronting raceway grooves 4, 9, and separators 22 each arranged between any adjoining balls 7 so as to make the adjoining balls 7 space apart from each other. The casing 5 is provided with threaded openings 27 for screws by which the end caps 6 and end seals 17, shown in FIG. 10, are secured to the casing 5. The casing 5 further has centering holes 28 for keeping the end caps 6 in alignment with the casing 5. Moreover the track rail 2 has on its lengthwise side surfaces 3 relief slots 31 that are formed along the raceway grooves 4 through which may move the retainer bands 18 holding the balls 7 in the casing 5.

The separators 22 are each composed of a column 23 and webs 24 integral with the column 23. On opposite faces in the running direction of the balls 7, the column 23 has ball-contacting surfaces 30 that may carry the balls 7 thereon. The webs 24 extend in opposite directions along the running direction of the balls 7 over the spherical surfaces of the balls 7 and each have a channel 29. The separators 22 may be made of non-metallic material such as synthetic resin, lubricant-impregnated resin or the like. The separators 22 are each entirely chamfered off for the smooth movement through the endless-circulating passages 21. As apparent from FIG. 2, the separators 22 are arranged between any two adjoining balls 7 and interconnected with each other by strings 26, which pass through the channels 29 of the webs 24. It is to be noted that the separators 22 are attached to the strings in a detachable manner.

Figure 3:
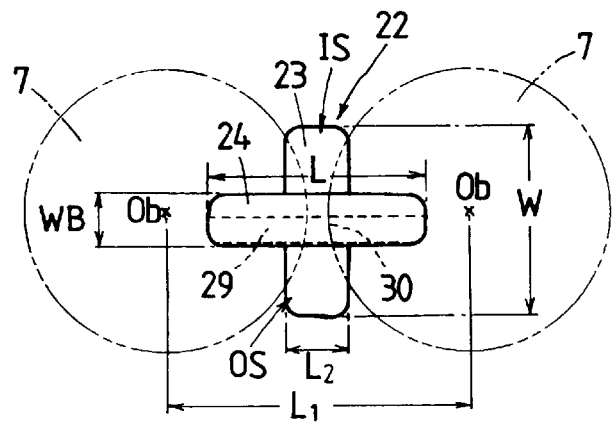
FIG. 3 is a plan view showing a preferred embodiment of the separator to be incorporated in the linear motion guide unit of FIG. 1.
Figure 4:
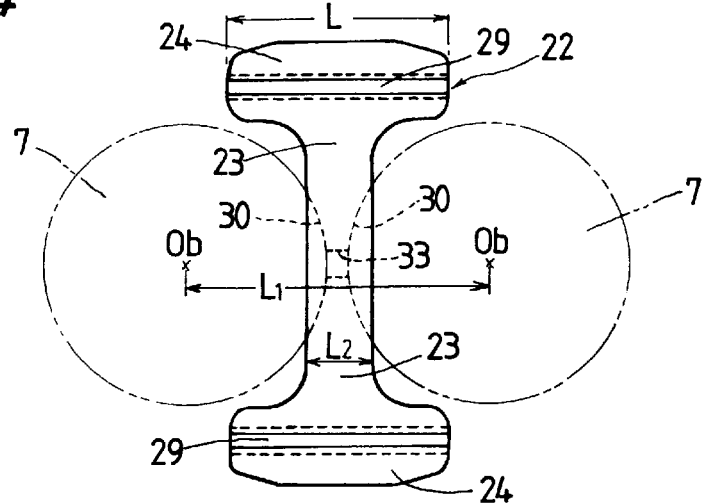
FIG. 4 is a front elevation showing the separator of FIG. 3.

The ball-contacting surfaces 30 on the separator column 23 are each formed in a semi-spherical concave corresponding to the sphere of the balls 7. Moreover the column 23 of the separator 22 has at the center of the ball-contacting surfaces 30 an opening 33 for receiving lubricant therein. As shown in FIG. 3, the column 23 of the separator 22 has a length $L_2$ along the travelling direction, which is uniform at its opposing ends, or the innermost curvature end IS and outermost curvature end OS with respect to the turnaround passages of the endless-circulating passages 21. While the widthwise length W of the column 23, normal to the travelling direction, is limited so as to not extend over the spherical surface of the ball 7, that is, less than the diameter of the ball 7, so that the column 23 has no interference with the walls of the endless-circulating passages 21. The separator column 23, as apparent from FIG. 5, has a substantially cylindrical configuration of the periphery that is defined within the diameter of the ball 7 so as to make no contact with the inner surfaces 38 of the turnaround passages 15 in the endless-circulating passages 21. It will be thus understood that the columns 23 of the separators 22 may run through the endless-circulating passages 21 without obstruction.

The webs 24 of the separator 22 are provided integral with the top and bottom of the column 23 and extend fore and aft over the spherical surface of the ball 7 so as to cover partially the ball 7. The webs 24 are each provided with the channel 29 through which the string 26 threads. The channels 29 slit lengthwise for making easy the attachment and/or detachment of the separators 22 to and from the strings 26. The separators 22 are interposed between any adjoining balls 7 in the endless-circulating passages 21 and interconnected with each other through the strings 26 threading through the channels 29. Further the channels 29 in the webs 24 are each provided at its slit with confronting lips 32, 32 to thereby keep the strings 26 from falling off the channels 29. It will be thus understood that the channels 29 in the webs 24 form guide means for holding the strings 26 for relative movement and the opposing lips 32, 32 at the channels 29 are to keep the strings 26 from unexpected falling off from the channels 29 during travelling.

The fore-and-aft length L of the webs 24 should be less than the span $L_1$ between the centers Ob, Ob of the adjoining balls 7 that are arranged on opposite faces of the separator interposed therebetween, so that the separators 22 may move smoothly through the endless-circulating passages 21 with no fear of obstructive interference between the webs of adjacent separators 22. Moreover the webs 24 each have a widthwise length WB, normal to the travelling direction, which is less than a clearance S between any one of the lengthwise side surfaces 3 of the track rail 2 and a confronting inner surface 35 of any one of depending side sections of the slider 1. This permits the webs 24 of the separators 22 to move unobstructively within the clearance S.

Figure 5:
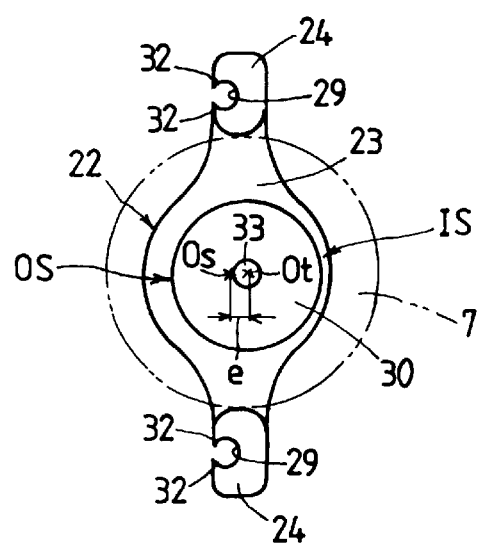
FIG. 5 is a side elevation showing the separator of FIG. 3.

As will be seen from FIG. 5, the center Ot of the ball-contacting surfaces 30 of the separators 22 is offset by a distance e towards the innermost curvature end IS of the column 23 in the endless-circulating passages 21 with respect to the center Os of the separators 22. In other words, owing to the ball-contacting surfaces 30 being offset with respect to the column 23, the separators 22 are arranged in the endless-circulating passages 21 such that there may be provided more allowance on the side of the outermost curvature end OS of the column 23. In general, the separators 22, on running through the endless-circulating passages 23, have a tendency of deviating towards innermost curvature surfaces 38 at the turnaround passages 15. This tendency causes the deviation of the column 23 towards the innermost curvature surfaces 38 of the turnaround passages 15 at the time during the separators 22 run through the turnaround passages 15, resulting in the obstructive interference between the innermost curvature ends of the columns 23 and the innermost curvature surfaces 38 of the turnaround passages 15. To cope with this adverse interference, the separator columns 23 are each designed such that its center Os is offset by the distance e towards the outermost curvature end OS with respect to the center Ot of the ball-contacting surfaces 30 of the column 23. Hence, the separators 22 are made to displace entirely towards outermost curvature surfaces 40 in the turnaround passages 15 so as to help ensure the smooth running along the turnaround passages 15.

Regarding the strings 26 threading through the channels 29 of the columns 23, in comparison between the curved turnaround passages 15 and the linear raceways 16 and return passages 12, the spacing interval between the adjacent separators 22, 22 undergoes somewhat change according to either of the curved and linear passages and, therefore, the strings 26 are arranged so as to make movement to some extent relatively to the channels 29 in the webs 24. By this design, the separators 22 are free from the unequal tensile force by the strings 26 and then may run smoothly through the endless-circulating passages 21.

In FIG. 2, the strings 26 are shown cut off at one location in the endless-circulating passage 21. As an alternative, the strings 26, although being not shown, may be formed in endless continuity. The strings 26 may be made of any one of synthetic resin filaments similar with fishing line, metal wires, synthetic resin-coated metal wires and strands. In particular the strings 26 may be made of any of synthetic resin filaments of polyamide, polyester, polyvinylidene fluoride and the like, metal wires of piano steel wire, stainless steel wire, tungsten wire, carbon wire and the like, strands of metal wires or the like laid together, and synthetic resin-coated wires or strands coated with synthetic resin.

To help ensure the smooth movement of the separators 22 along the endless-circulating passages 21, the return passages 12 in the casing are formed with recesses 36 for guiding the webs 24 while the turnaround passages 15 in the end caps 6 are slotted at 37 to accommodate the webs 24 for smoothly sliding manner.

Next referring to FIGS. 6 to 8, another embodiment of the separators to be incorporated in the linear motion guide unit of the present invention will be explained in detail. In the following description, similar reference characters designate elements or components identical or similar in structure and function in both the separators in FIGS. 6 to 8 and the first embodiment described above with referring to FIGS. 3 to 5, and the previous description will be applicable.

Figure 6:
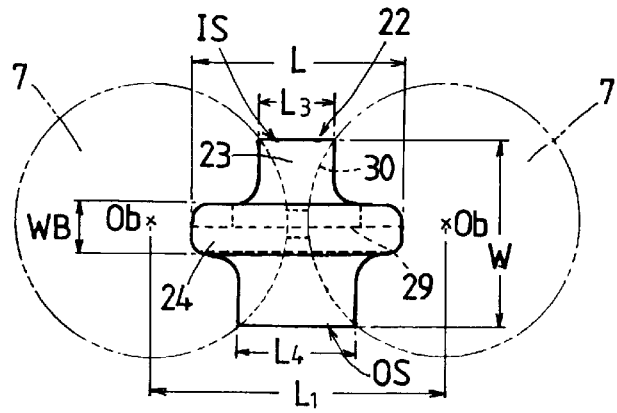
FIG. 6 is a plan view showing a second embodiment of the separator to be incorporated in the linear motion guide unit of FIG. 1.
Figure 7:
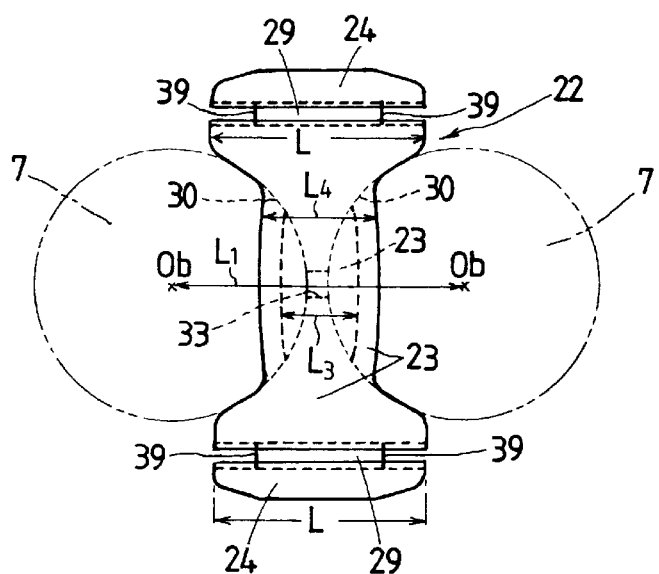
FIG. 7 is a front elevation showing the separator of FIG. 6.
Figure 8:
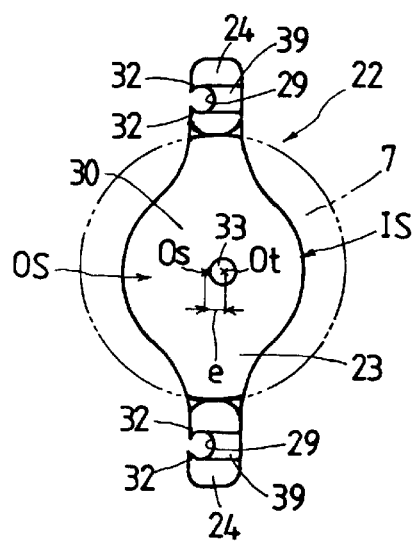
FIG. 8 is a side elevation showing the separator of FIG. 6.

The separators 22 in FIGS. 6 or 7 are different from the separators 22 in FIG. 3 in the things that the ball-contacting surfaces 30 are provided extending partly to the webs 24 and the separator columns 23 are designed short in the length $L_3$ along the travelling direction thereof at the innermost curvature end IS, compared with the length $L_4$ at the outermost curvature end OS with respect to the turnaround passages of the endless-circulating passages 21. The channels 29 in the webs 24 of the separators 22 are each cut away at their opposing ends 39, 39 so that the strings 26 threading through the channels 29 may be free from such obstructive interference that might otherwise occur at the opposing edges of the channels 29 during the movement along the curvatures of the turnaround passages 15. In addition, as the strings 26 may make sliding movement to some extent relatively to the channels 29 in the webs 24, the separators 22 may be released from strings 26 so as to move smoothly along the turnaround passages 15.

Figure 9:
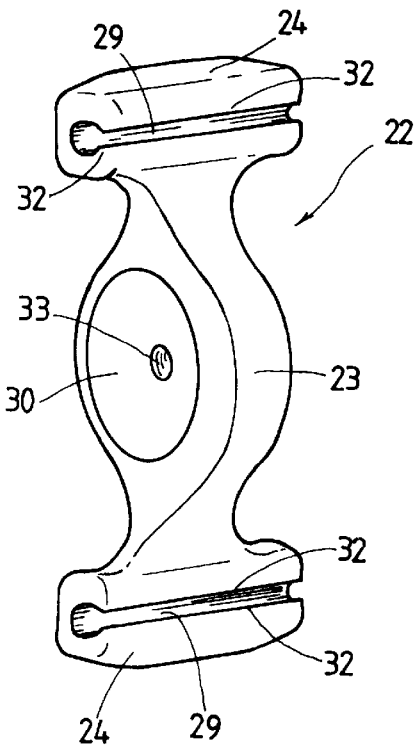
FIG. 9 is a perspective view showing an another separator similar in type to that in FIG. 3.

Moreover FIG. 9 shows another separator to be incorporated in the linear motion guide unit.

This separator 22 is similar to the separator 22 shown in FIG. 3, but shown rounded at the transitional portions from the column 23 to the webs 24. The whole configuration of the separator 22 will be seen from FIG. 9.

While the present invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A linear motion guide unit comprising;
   a track rail having first raceway grooves on lengthwise side surfaces thereof;
   a sliding element movable in a sliding manner along and with respect to the track rail and composed of a casing and end caps attached on the casing, and the casing having second raceway grooves confronting the raceway grooves of the track rail;

rolling elements running through endless-circulating passages that consists of return passages in the casing, turnaround passages in the end caps and raceways defined between the confronting raceway grooves;

separators arranged between any two adjoining rolling elements running through the endless-circulating passages so as to space apart the rolling elements from each other;

the separators each having a separator column formed with ball-contacting surfaces for carrying the rolling elements thereon at opposite faces in a running direction of the rolling elements, and webs formed integrally with the column and extended fore-and-aft along the running direction of the rolling elements over the rolling elements, and the webs being each provided therein with channels; and strings threading through the channels in the web so as to interconnecting the separators in series.

2. A linear motion guide unit constructed as defined in claim 1, wherein the webs each have a length along the running direction of the rolling elements, the length being shorter than a span between centers of the adjoining rolling elements that are arranged on opposite faces of the separator interposed therebetween.

3. A linear motion guide unit constructed as defined in claim 1, wherein the webs each have a widthwise length, normal to the running direction, which is less than a clearance between any one of the lengthwise side surfaces of the track rail and a confronting inner surface of any one of depending side sections of the slider.

4. A linear motion guide unit constructed as defined in claim 1, wherein the columns of the separators each have a widthwise length, normal to the running direction, which is shorter than a diameter of the rolling element, so that the column has no interference with walls of the endless-circulating passages.

5. A linear motion guide unit constructed as defined in claim 1, wherein centers of the ball-contacting surfaces on the columns are offset towards inner curvature wall in the endless-circulating passages with respect to centers of the separators.

6. A linear motion guide unit constructed as defined in claim 1, wherein the channels in the webs are each provided at a slit thereof with opposing lips to keep the string from unexpected falling off from its associated channel.

7. A linear motion guide unit constructed as defined in claim 1, wherein the separators are designed so as to be movable in a sliding manner with respect to the strings threading through the channels in the webs and also detachably attached to the strings.

8. A linear motion guide unit constructed as defined in claim 1, wherein the strings are any one of endless and sheared forms in the endless-circulating passages.

9. A linear motion guide unit constructed as defined in claim 1, wherein the strings are made of any of synthetic resin filaments, metal wires, synthetic resin-coated metal wires and strands.

10. A linear motion guide unit constructed as defined in claim 1, wherein the separators are made of any one of synthetic resin and lubricant-impregnated synthetic resin.

11. A linear motion guide unit constructed as defined in claim 1, wherein the separators are each provided at the ball-contacting surfaces thereof with openings for receiving lubricant therein.

12. A linear motion guide unit constructed as defined in claim 1, wherein recesses for guide the webs are formed at both of the return passages in the casing and the turnaround passages in the end caps.

13. A linear motion guide unit constructed as defined in claim 1, wherein the channels in the webs of the separators are partly cut away at their lengthwise opposing ends.

* * * * *